United States Patent
Reubelt et al.

[11] Patent Number: 6,027,250
[45] Date of Patent: Feb. 22, 2000

[54] ROLLER BEARING SEGMENT FOR SWASHPLATES AND OTHER LIMITED-OSCILLATION APPLICATIONS

[75] Inventors: Leo M. Reubelt; Edward P. Butler, III, both of Torrington; John M. Grillo, Plymouth; Brian P. Berg, Collinsville; Vincent E. Leto, Torrington, all of Conn.

[73] Assignee: The Torrington Company, Torrington, Conn.

[21] Appl. No.: 09/138,316

[22] Filed: Aug. 21, 1998

[51] Int. Cl.[7] .............................. F16C 32/00; F01B 3/00
[52] U.S. Cl. ................................. 384/2; 92/12.2
[58] Field of Search ................. 384/2; 92/12.2; 417/269; 91/499; 74/60

[56] References Cited

U.S. PATENT DOCUMENTS

| | | | |
|---|---|---|---|
| 3,584,514 | 6/1971 | Hamma | 74/60 |
| 4,029,367 | 6/1977 | Schwede et al. | 384/2 |
| 4,314,732 | 2/1982 | Murphy | 384/2 |
| 4,577,911 | 3/1986 | Fredericksen et al. | 384/2 |
| 4,627,330 | 12/1986 | Beck, Jr. | 384/2 X |
| 4,710,107 | 12/1987 | Kanies | 417/269 |
| 4,741,251 | 5/1988 | Hayashi et al. | 92/57 |
| 4,884,902 | 12/1989 | Kispert et al. | 384/2 X |
| 4,934,253 | 6/1990 | Berthold et al. | 91/506 |
| 5,085,053 | 2/1992 | Hayashi et al. | 60/488 |
| 5,095,807 | 3/1992 | Wagenseil | 92/12.2 |
| 5,253,576 | 10/1993 | Bethke | 92/12.2 |
| 5,383,391 | 1/1995 | Goade et al. | 92/12.2 |
| 5,390,584 | 2/1995 | Fritz et al. | 92/12.2 |
| 5,538,401 | 7/1996 | Schaffner et al. | 417/222.1 |
| 5,554,007 | 9/1996 | Watts | 417/222.1 |
| 5,590,579 | 1/1997 | Weber | 92/12.2 |
| 5,630,352 | 5/1997 | Todd | 384/2 |
| 5,735,172 | 4/1998 | Parker | 74/60 |

*Primary Examiner*—Thomas R. Hannon
*Attorney, Agent, or Firm*—Robert F. Palermo

[57] ABSTRACT

An oscillating bearing is disclosed for a variable-displacement axial piston hydraulic machine having a swashplate with a convex semi-cylindrical bearing face with provisions for attaching the oscillating bearing, and a housing with a concave semi-cylindrical bearing saddle. The oscillating bearing includes thin outer and inner race members having centered openings and formed in arcs congruent with the concave surface of the bearing saddle of the housing and the convex bearing face of the swashplate, respectively. The outer race member has support means on at least one axial end for supporting a timing member which engages a timing feature of the swashplate and synchronizes motion for all parts of the oscillating bearing, and the inner race member has means for holding the inner race against the convex bearing face of the swashplate. A separator is interposed between the inner and outer race members, the separator being formed in an arc having inner and outer surfaces parallel to the proximal surfaces of the race members, the separator also having an axially centered opening and two additional substantially rectangular openings axially spaced from the axial ends of the separator and the centered opening. The additional openings serve as pockets for anti-friction rollers. The separator further has one axial end which extends beyond the proximal axial ends of the inner and outer races and which includes a timing notch for engaging the timing member.

7 Claims, 3 Drawing Sheets

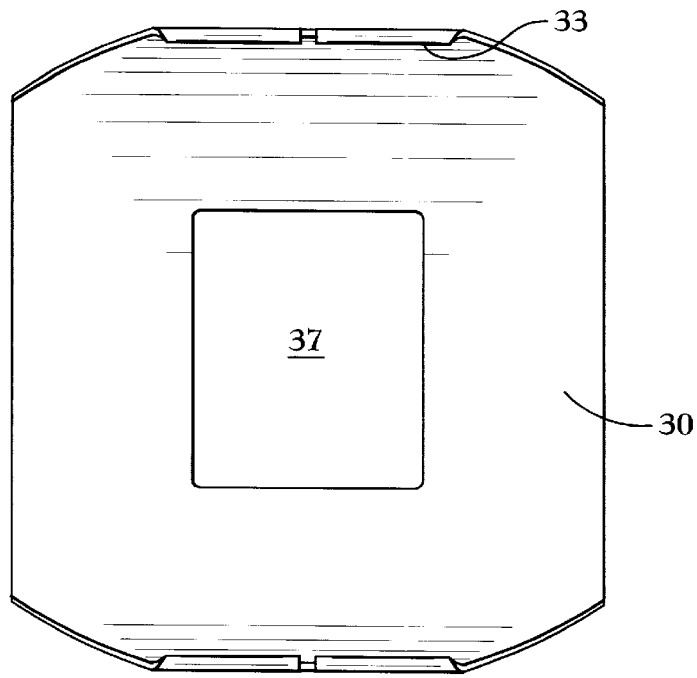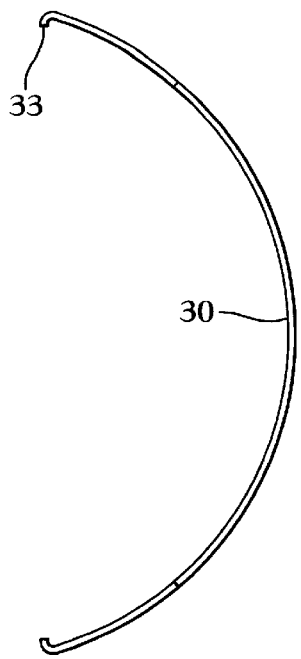
*Fig. 3a*      *Fig. 3b*
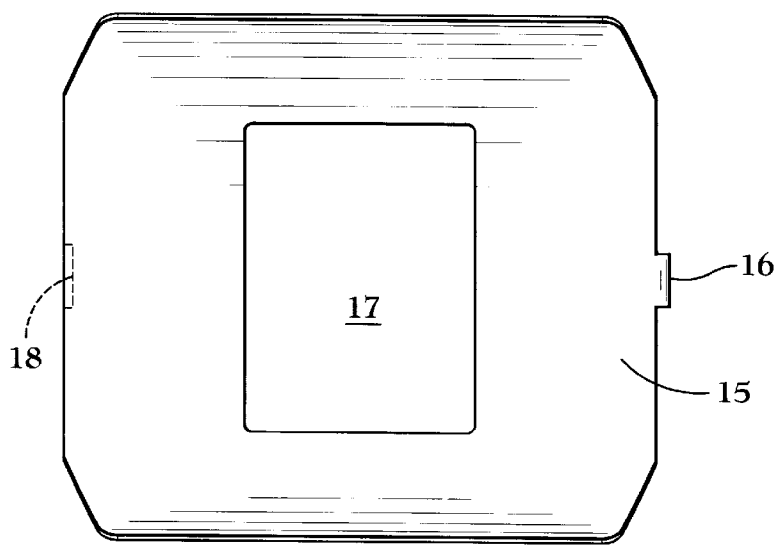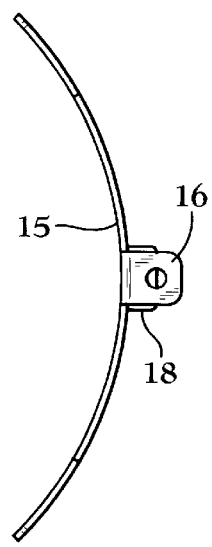
*Fig. 4a*      *Fig. 4b*

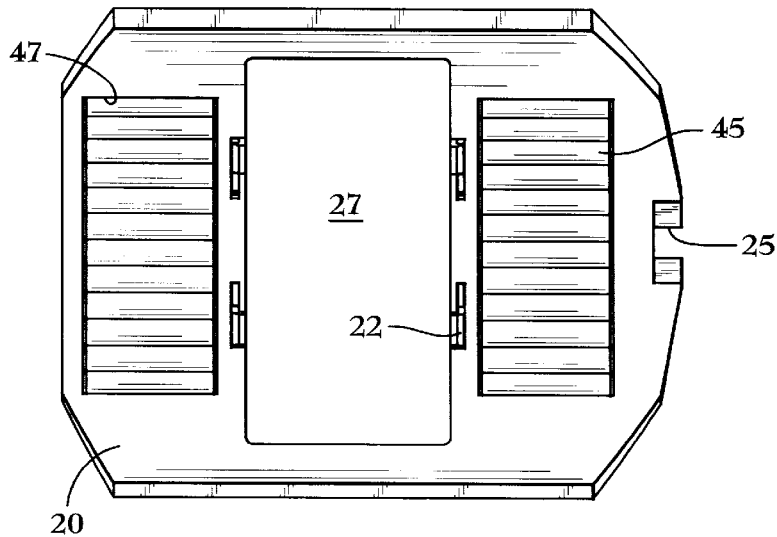
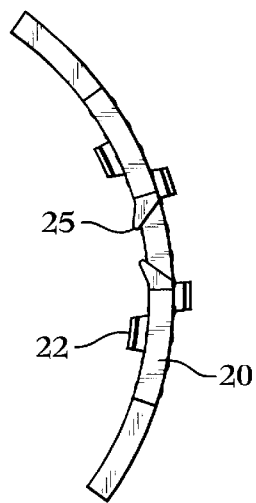
Fig. 5a  Fig. 5b
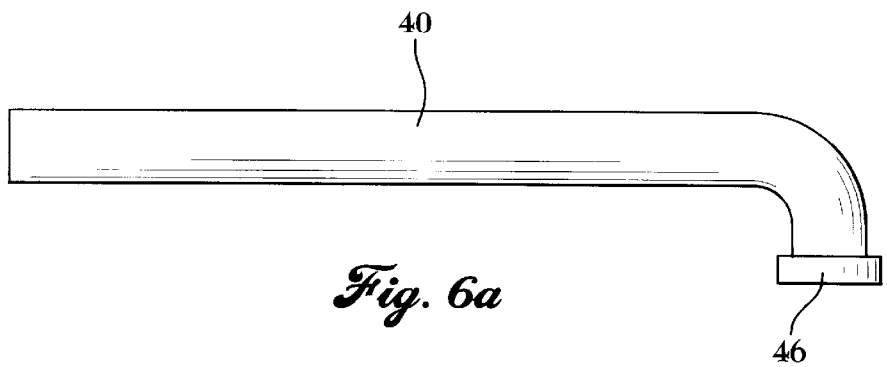
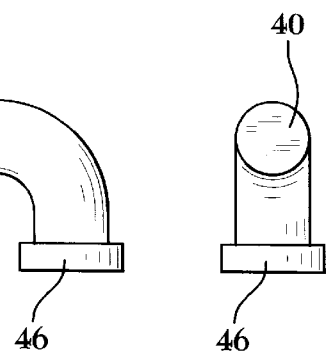
Fig. 6a  Fig. 6b

ROLLER BEARING SEGMENT FOR SWASHPLATES AND OTHER LIMITED-OSCILLATION APPLICATIONS

BACKGROUND OF THE INVENTION

This invention relates generally to roller bearings and more particularly to roller bearings for use in applications having movement over only a limited arc, as in the case of swashplates in variable-displacement axial piston pumps and motors.

Variable-displacement axial piston pumps and motors have rotating cylinder blocks and employ swashplates which tilt in an oscillating manner to control piston travel within the cylinders. In current heavy duty swash plate applications, because of their limited motion, the swashplates are commonly supported by roller bearing saddle segments. Since it is difficult to machine a semi-cylindrical surface with a high degree of accuracy, these bearing segments may be made as large pieces of bearing quality material with cylindrical bored, machined, and ground fully circular raceways which are then cut to the correct arc value. This method of fabrication results in discard of a portion of the costly machined and ground components of bearing quality material. Moreover, the bearing segments take up added space because of the thickness of components dictated by the fabrication method. Assembly into the machine is also made more difficult by the number of separate individual race, roller, cage, and timing components which must be installed.

In medium duty applications, the same handling of heavy parts, waste of expensive materials, and other fabrication difficulties exist, but for this less severe service, instead of roller bearings, bronze/polytetrafluorethylene sleeve liners are used in the interface between the bearing faces of the swashplate and the saddle. Although this substitution somewhat simplifies fabrication of the bearing, the performance of the assembly in service is often unreliable in that it is difficult to smoothly adjust displacement of the piston pump and/or motor due to intermittent sticking and slipping between the sleeve liners and the bearing faces. This stick-slip is the cause of jerky overcontrol of the machine which results in operator discomfort, erratic performance and even a safety hazard due to non-response or delayed-response to control movements.

The foregoing illustrates limitations known to exist in present swashplate bearings, and it would be advantageous to provide an alternative directed to overcoming one or more of those limitations. Accordingly, a suitable alternative is provided including features more fully disclosed hereinafter.

SUMMARY OF THE INVENTION

In one aspect of the present invention, an oscillating bearing is provided for a variable-displacement axial piston hydraulic machine having a swashplate with a convex semi-cylindrical bearing face and a housing with a concave semi-cylindrical bearing saddle. The oscillating bearing includes a thin outer race member and inner race member, shaped to approximate the dimensions of the bearing face and the saddle and formed in arcs congruent with the concave surface of the bearing saddle of the housing and the convex bearing face of the swashplate, respectively, each said race member having an axially centered opening, the outer race member having support means on at least one axial end for supporting a timing member which engages a timing feature on said swashplate and synchronizes motion for all parts of said oscillating bearing, and the inner race member having means for holding the inner race against the convex bearing face of said swashplate; a separator interposed between said inner and outer race members, said separator being formed in an arc having inner and outer surfaces parallel to the proximal surfaces of said race members, said separator also having an axially centered opening and two additional substantially rectangular openings axially spaced from the axial ends of the separator and the centered opening, said additional openings serving as pockets for anti-friction rollers, said separator further having one axial end which extends beyond the proximal axial ends of said inner and outer races and which includes a timing notch for engaging said timing member; and a plurality of cylindrical rollers sufficient to fill both roller pockets, said rollers having diameters sufficient to project above and below the surfaces of said separator and to bear against said race members.

The foregoing and other aspects of the invention will become apparent from the following detailed description, when considered in conjunction with the accompanying drawings.

BRIEF DESCRIPTION OF THE DRAWINGS

FIGS. 3a and 3b are plan and end views, respectively, of the inner race member;

FIGS. 4a and 4b are plan and end views of the outer race member;

FIGS. 5a and 5b are plan and end views of the separator; and

FIGS. 6a and 6b are side and end views of one embodiment of the timing member.

DETAILED DESCRIPTION

Figure 1:
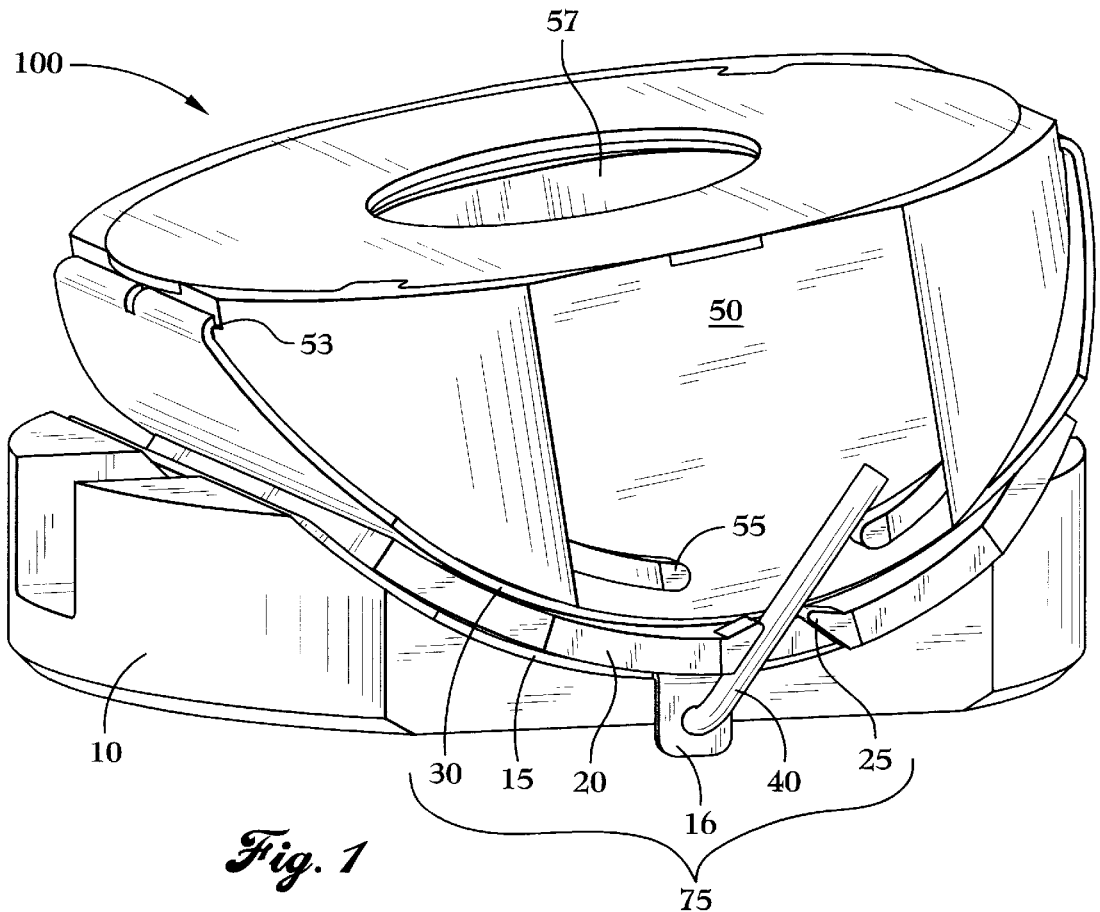
FIG. 1 is schematic perspective view of an oscillating bearing of the invention in conjunction with a swashplate illustrating the application environment of the bearing.

FIG. 1 shows a swashplate assembly 100 which generally indicates the service environment of the oscillating bearing assembly 75 of the invention. The concave semi-cylindrical bearing saddle 10 is mounted in a well known manner to a machine housing (not shown) and, together with the bearing assembly 75, supports the swashplate 50 by its convex bearing face. The swashplate 50 has two oppositely situated notches or steps 53, for engaging the inner race member 30 of the bearing assembly, a radially centered opening 57, for passage of a rotatable shaft (not shown), and a timing feature 55. In operation, the swashplate 50 oscillates in the cradle 10 to each side of the center by approximately twenty degrees, more or less, axially driving or being driven by pistons (not shown) reciprocating in a rotating cylinder block (not shown) of a fluid machine.

Figure 2:
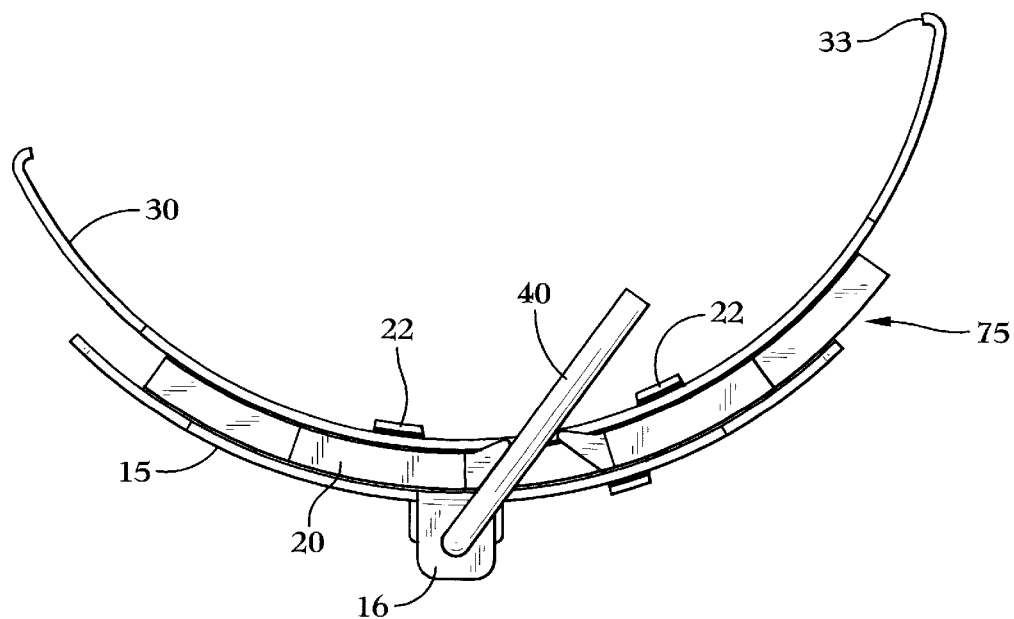
FIG. 2 is an axial end view of the bearing assembly.

The oscillating bearing assembly 75 in FIGS. 1 and 2 comprises an outer race member 15, a timing member 40, a separator 20 with rollers (not visible in this view), and an inner race member 30.

The outer race member 15, seen here and in FIGS. 4a and 4b, is preferably a thin strip of bearing quality steel shaped to approximate the dimensions of the bearing face and the saddle having an opening 17 at its center to accommodate the rotatable machine drive shaft (not shown) and formed in an arc congruent with the bearing face of the swashplate 50. A support 16 for a timing member (40 in FIGS. 4a and 4b) is provided at one axial edge of the race member. An additional tab 18 is preferably provided on the outer race at the axial edge opposite the support 16 as the application may require. This fits in a slot in the saddle 10 of the housing to keep the outer race stationary on the saddle in cases where it is preferable to fix the oscilllating bearing assembly to the saddle.

FIGS. 3a and 3b show the inner race member 30, which is again preferably a thin strip of bearing quality steel, similarly shaped as the outer race member and formed in an arc, and also having an opening 37 at its center to accommodate the rotating shaft. It also preferably has two clips 33, one formed at each radial edge of the arc, for engaging the notches 53 of the swashplate to attach the inner race 30 to the swashplate 50. The inner race member 30 may be held against the bearing face of the swashplate 50 by other means (not illustrated) such as slots in an overhanging edge of the swashplate for receiving straight edges of the inner race member or by many other techniques for causing the member to rest firmly against the swashplate and to oscillate therewith. Note that, although the openings 17, 37 are shown as being substantially rectangular in shape, they may advantageously be formed with radiuses at their radial ends to conform more closely to the form of the rotatable shaft about which they oscillate. The only limitation is that they must have sufficiently long straight axial edges to provide oscillating clearance about the shaft at both radial extremes.

The separator 20 is shown in FIGS. 5a and 5b. It also is shaped as the races and is formed in an arc with inner and outer radii conforming to the proximal surfaces of the inner and outer race members, respectively. It may be made from any suitable material, but is preferably molded from a polymeric material chosen for compatibility with the chemical and thermal service environment. It also has a substantially centered opening 27 for the shaft, but has two additional substantially rectangular openings 47 which are spaced axially from the centered opening and its axial edges. The additional openings are used as roller pockets to retain a full complement of cylindrical rollers 45 which have diameters sufficiently large to project above and below the surfaces of the separator to bear against the inner and outer race members. One axial edge of the separator 20 is extended slightly to provide for a timing notch to project beyond the axial ends of the inner and outer races for engagement with the timing member 40.

One advantage of molding the separator 20 from polymeric material, besides cost, is the ability to integrally form orientation and guide features 22 on the separator. These may be in the form of snap tabs which grip the inner and outer races to hold the rollers 45 in the pockets 47 during installation of the bearing assembly 75 on the swashplate 50. These snap tabs may be formed on the axial edges of the separator 20 or on the axial edges of the centered opening 27 thereof. Such orientation and guide features may also be provided on either or both of the inner and outer races 30, 15. This is not illustrated, but would consist of radially extending tabs formed at the axial edges of the centered openings or at the axial ends of the races. The tabs would provide directionally stable positioning for the motion of the races 30, 15, the separator 20, and the rollers 45 to limit wandering during operation, as well as unity of the assembly 75 during installation.

When operating, the inner race 30 is fixed to the bearing face of the swashplate 50 and oscillates with it. Since it is made as a stamped and hardened bearing quality steel member, it permits the swashplate and its convex bearing face to be made from a less costly mild steel or equivalent without sacrificing the anti-friction and wear qualities desired for bearing service. The same applies to the outer race 15 and the concave bearing saddle 10. In order to maintain the components of the bearing assembly 75 in the proper mutual positions during operation, the timing member 40 is rotatably supported at its head end 46 by the timing member support tab 16 of the outer race 15. It extends radially through the timing notch 25 of the separator, past the edge of the inner race 30 and engages with the timing feature 55 in the swashplate 50. The timing member 40 is free to slide within the timing notch 25 and the timing feature 55 in order to prevent binding, but it constrains the separator 20 to oscillate with a defined synchronicity with respect to the inner and outer races. This prevents the rollers 45 and the separator from traveling, or precessing, out of the proper load-bearing position during operation.

The oscillating bearing of the invention has the advantages of being easy to install due to being unitized by the orientation and guide tabs provided on one or more of the races or the separator; being less expensive to fabricate due to its use of thin bearing quality steel stampings for the inner and outer races; being capable of heavier load-bearing due to use of a full complement of rollers in a separator formed with rectangular pockets without roller separation as compared to a standard bearing cage; and being integrally self timing due to inclusion of the timing member with the outer race as part of the bearing assembly.

Having described the invention, we claim:

1. An oscillating bearing for a variable-displacement axial piston hydraulic machine having a swashplate with a convex semi-cylindrical bearing face with provisions for attachment of said oscillating bearing, and a housing with a concave semi-cylindrical bearing saddle, the oscillating bearing comprising:

thin outer and inner race members, formed in arcs congruent with the concave surface of the bearing saddle of the housing and the convex bearing face of the swashplate, respectively, each said race member having an axially centered opening, the outer race member having support means on at least one axial end for supporting a timing member which engages a timing feature in said swashplate and synchronizes motion for all parts of said oscillating bearing, and the inner race member having means for holding the inner race against the convex bearing face of said swashplate;

a separator interposed between said inner and outer race members, said separator being formed in an arc having inner and outer surfaces parallel to the proximal surfaces of said race members, said separator also having an axially centered opening and two additional substantially rectangular openings axially spaced from the axial ends of the separator and the centered opening, said additional openings serving as pockets for anti-friction rollers, said separator further having one axial end which extends beyond the proximal axial ends of said inner and outer races and which includes a timing notch for engaging said timing member; and a plurality of cylindrical rollers sufficient to fill both roller pockets, said having diameters sufficient to project above and below the surfaces of said separator and to bear against said race members.

2. The oscillating bearing of claim 1, further comprising:

means on at least one of said inner race member, said outer race member, and said separator for joining the bearing components into an assembly for easy handling and installation.

3. The oscillating bearing of claim 1, wherein the means for holding the inner race against the convex bearing face of said swashplate comprises clips formed at both radial ends of its arc for engaging notches on the proximal edges of the swashplate.

4. The oscillating bearing of claim 1, wherein the means for holding the inner race against the convex bearing face of said swashplate comprises straight edges on the radial ends of the inner race member for engaging slots in an overhanging edge of the swashplate.

5. The oscillating bearing of claim 1, wherein said separator comprises a structure molded from polymeric material with integrally formed guiding and joining features for orienting and connecting to said inner and outer race members.

6. The oscillating bearing of claim 1, further comprising:
    means on said outer race for fixing said outer race on said concave semi-cylindrical saddle.

7. The oscillating bearing of claim 6, wherein the means on said outer race for fixing said outer race on said concave semi-cylindrical saddle comprises a tab projecting from at least one of the axial edges of said outer race for engaging a slot in said saddle.

* * * * *